(12) United States Patent
Michel et al.

(10) Patent No.: US 6,665,544 B1
(45) Date of Patent: Dec. 16, 2003

(54) SIM CARD READER AND MOBILE TELEPHONE EQUIPPED WITH SAME

(75) Inventors: Stéphane Michel, Montfort sur Meu (FR); Koji Matsuda, Rennes (FR); Laurent Steenackers, Rennes (FR); Yann Naslain, Rennes (FR); Stéphane Pierre Yves Douget, Rennes (FR); Herve Jean Guy Beauchaud, Saint Jacques de la Lande (FR); Hiroshi Ozaki, Rennes (FR)

(73) Assignee: Mitsubishi Electric France, Nanterre (FR)

( * ) Notice: Subject to any disclaimer, the term of this patent is extended or adjusted under 35 U.S.C. 154(b) by 0 days.

(21) Appl. No.: 09/526,555

(22) Filed: Mar. 16, 2000

(30) Foreign Application Priority Data

Mar. 17, 1999 (FR) .............................. 99 03328

(51) Int. Cl.[7] .............................................. H04B 1/38
(52) U.S. Cl. ...................... 455/558; 455/90; 455/550.1; 455/557
(58) Field of Search ................................ 455/558, 557, 455/90, 575.1; 45/558

(56) References Cited

U.S. PATENT DOCUMENTS 5,620,120 A    4/1997   Tien 6,009,315 A  * 12/1999   De Larminat et al. ........ 455/90
6,101,372 A  *  8/2000   Kubo .......................... 455/90

FOREIGN PATENT DOCUMENTS

GB              2 326 050           12/1998

* cited by examiner

*Primary Examiner*—William Trost
*Assistant Examiner*—Brandon J Miller
(74) *Attorney, Agent, or Firm*—Oblon, Spivak, McClelland, Maier & Neustadt, P.C.

(57) ABSTRACT

A reader (18) for a smart card (S) for a mobile telephone (10) includes a baseplate (40), carrying conducting contacts suitable for engaging with corresponding conducting contacts on the card (S), and a device for guiding and actuating the card (S) for translational movement thereof in a direction of installation (D1) of the card, between a card-gripping position in which the card is accessible and a use position in which the card (S) is held in place with respect to the baseplate (40). The device for guiding and actuating the card includes a movable slide-in unit (42) for supporting the card (S) and a device for immobilizing the card (S) in the direction of installation (D1). The slide-in unit (42) slides with respect to the baseplate (40) between an engaged position in which the card (S) is in a use position and a disengaged position in which the card (S) is in a gripping position.

20 Claims, 4 Drawing Sheets

SIM CARD READER AND MOBILE TELEPHONE EQUIPPED WITH SAME

BACKGROUND OF THE INVENTION

1. Field of the Invention

The present invention relates to a reader for a smart card, especially an identification smart card, for a mobile telephone, of the type comprising a baseplate, carrying conducting contacts suitable for engaging with corresponding conducting contacts on the card, and means for guiding and actuating the card for its translational movement in a direction of installation of the card, between a card-gripping position in which the card is accessible and a use position in which the card is held in place with respect to the baseplate.

2. Discussion of Background

In the GSM standard, identification smart cards for cellular telephones are generally called "SIM (Subscriber Identity Module) cards". Such a smart card has an integrated circuit used for storing the identity of a subscriber having right of access to the network, as well as algorithms for authenticating the latter.

SIM cards are rectangular in shape. One of the corners is cut off as a bevel. This cut-off corner provides the polarization function, so as to ensure that the card is correctly positioned in the reader. The contacts on the chip are visible on the same side of a main face of the card with which they are flush.

SIM card readers of certain mobile telephones include connectors placed directly on the motherboard of the telephone. The connectors then occupy a large amount of space on the motherboard, which increases the area of the motherboard and therefore the overall size of the telephone.

In order to reduce the area of the motherboard, the smart-card readers are advantageously separated from it.

Document U.S. Pat. No. 5,790,659 describes, by way of example, a card reader of the aforementioned type. With this reader, the card is inserted into the reader through a slot made inside the body of the telephone. When the card is in its use position, it is completely concealed inside the body. Thus, in order to allow the user to remove it, a pusher is provided in the card reader. This pusher is controlled by a knob projecting on the rear face of the telephone.

However, the insertion and removal of the card are not straightforward since the pusher has a very short travel. Thus, the card, after it has been moved by the pusher, projects only a few millimetres from the reader and it is difficult to grip it by its free end.

SUMMARY OF THE INVENTION

The object of the invention is to provide a solution to the problem of the difficulty of handling a SIM card when inserting it into or removing it from a card reader, especially one installed in a mobile telephone.

For this purpose, the subject of the invention is a reader for an identification smart card, especially for a mobile telephone, of the aforementioned type, characterized in that the means for guiding and actuating the card comprise a movable slide-in unit for supporting the card, having means for immobilizing the card in said direction of installation, which slide-in unit can move slidingly with respect to said baseplate between an engaged position in which the card is in its use position and a disengaged position in which the card is in its gripping position, in that the slide-in unit comprises means for supporting the card forming, at least partially, an area of support for the card in its gripping position and said area of support is open for the insertion of the card in its gripping position in a direction of insertion which is offset at some angle to said direction of installation, said direction of insertion being parallel to said area of support for the card.

Depending on the particular embodiments, the reader has one or more of the following characteristics:

- the conducting contacts on the card and on the baseplate are far apart in the gripping position of the card and the conducting contacts on the card and on the baseplate are in contact with each other in the use position of the card;
- said area of support for the card in its gripping position is formed, on the one hand, by said means for supporting the card and, on the other hand, by a bearing surface made on the baseplate;
- the baseplate has a ramp for guiding the card towards said bearing surface, which ramp is inclined so that its height varies along the direction of insertion of the card;
- the slide-in unit has an end stop for the card in its gripping position while it is being put into position on the area of support in said direction of insertion;
- the slide-in unit has a cut-away for manual access to the card in its gripping position in order to move it in the direction of insertion for the purpose of removing it;
- the slide-in unit has a blade for masking the conducting contacts on the baseplate, which blade can be moved between a position in which it is away from the conducting contacts, when the slide-in unit is in its engaged position, and a position in which it masks the conducting contacts, preventing access to them when the slide-in unit is in its disengaged position;
- the baseplate has a base through which the conducting contacts project and tabs for retaining the card in its use position in contact with the conducting contacts, said tabs extending so as to face said base;
- the baseplate has surfaces for laterally guiding the card, which surfaces extend along the direction of installation of the card;
- the baseplate has an end stop for the card in its use position during its movement in the direction of installation;
- the end stop for the card carried by the baseplate and the means for immobilizing the card in the direction of installation have intercalated complementary projecting profiles, which can move translationally with respect to each other in said direction of installation.

The subject of the invention is also an item of telecommunication equipment, especially a mobile item of telecommunication equipment, especially a mobile telephone, having a card reader as defined above.

Depending on the particular embodiments, the mobile item of equipment has one or more of the following characteristics:

- the item of equipment comprises a body in which a housing for accommodating a supply battery is defined, and means preventing the slide-in unit from moving towards its disengaged position when the battery is accommodated in the housing;
- the item of equipment comprises a body in which a housing for accommodating a supply battery is defined, and means preventing the battery from being accommodated in the housing when the slide-in unit is not in its engaged position;

in the disengaged position, the movable slide-in unit projects inside the housing in a region normally occupied by the supply battery;

the body of the item of equipment has a recess made at least opposite the conducting contacts on the baseplate, making said conducting contacts accessible in the absence of the slide-in unit;

the slide-in unit, in the engaged position, extends into said recess and has a manoeuvring surface accessible through said recess;

the body of the item of equipment has a cut-away, which cut-away partially defines a passage for inserting the card in said direction of insertion towards its gripping position;

the body of the item of equipment has means for guiding the slide-in unit in said direction of installation.

BRIEF DESCRIPTION OF THE DRAWINGS

The invention will be more clearly understood on reading the description which follows, given solely by way of example, and with reference to the drawings in which.

DESCRIPTION OF THE PREFERRED EMBODIMENTS

Referring now to the drawings, wherein like reference numerals designate identical or corresponding parts throughout the several views, and more particularly to FIGS. 1 to 8 thereof, there are illustrated embodiments of the present invention as will now be discussed.

Figure 2:
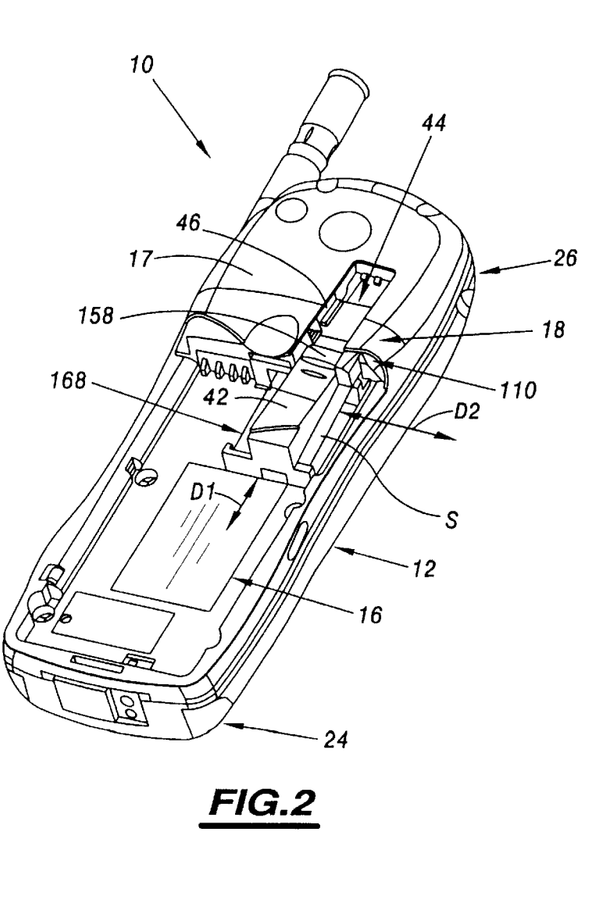
Figure 3:
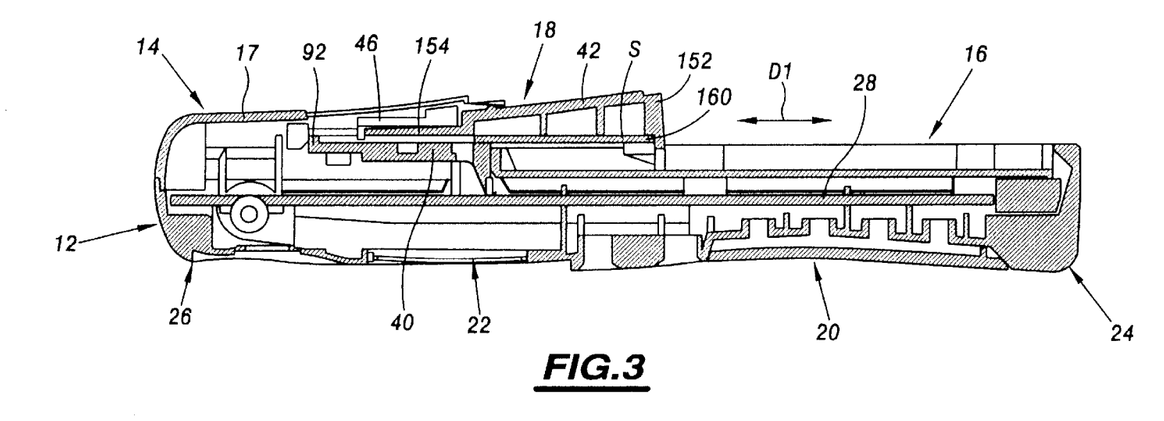
FIG. 3 is a longitudinal sectional view of the mobile telephone in FIG. 2, taken in a plane passing through the movable slide-in unit.
Figure 4:
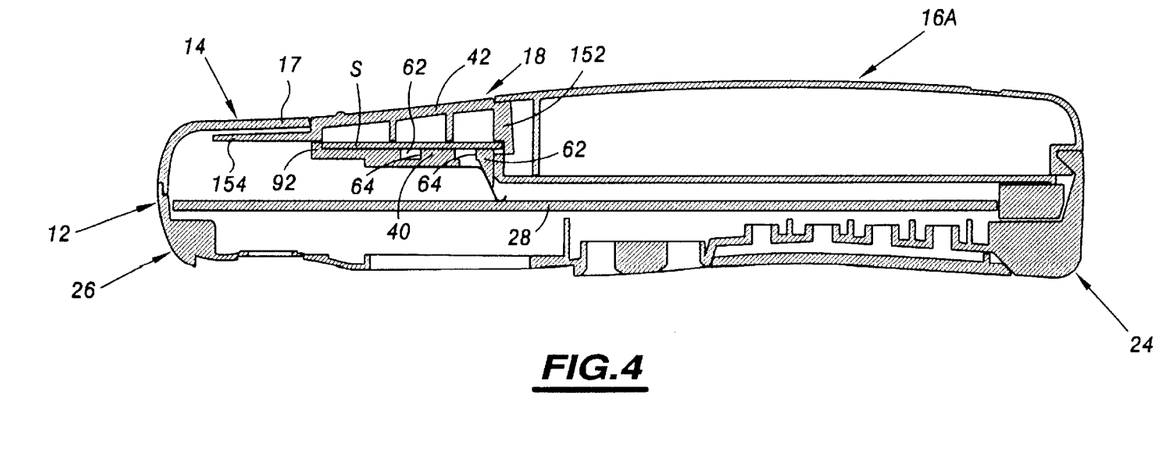
FIG. 4 is a simplified longitudinal sectional view of the mobile telephone in FIG. 1, in which a supply battery has been fixed to the body.

The mobile telephone 10 shown in FIGS. 1 to 4 comprises a body 12 from a rear face 14 of which emerges a housing 16 for accommodating a supply battery 16A, visible in FIG. 4. The housing 16 occupies most of the lower region of the rear face 14. The upper region of the rear face 14 is bounded by a cover 17 which extends the external surface of the battery 16A when the latter is installed in the housing 16.

A SIM card reader 18 emerging in the housing 16 is provided in the body 12. It is manually accessible from the cover 17, under which it is placed.

As shown in FIG. 3, the telephone 10 has, on its front face opposite the rear face 14, a keypad 20, a display screen 22, a microphone (not shown) provided at its lower end 24 and a sound reproduction element (not shown) placed near its upper end 26. A motherboard 28 is placed inside the body 12. Most of the electronic components for operating the mobile telephone are placed on this motherboard.

The reader 18 essentially comprises, on the one hand, a baseplate 40 bearing conducting metal contacts intended to come into contact with the chip of a SIM card denoted by S and, on the other hand, a movable slide-in unit 42 for supporting the card S.

Figure 1:
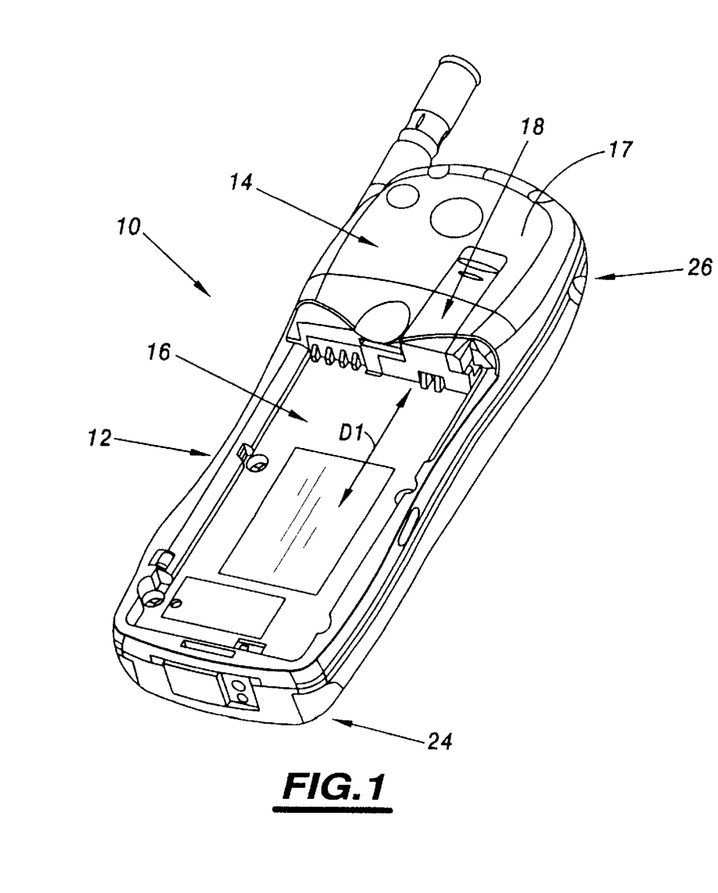
FIGS. 1 and 2 are three-quarter perspective views of the rear face of a mobile telephone according to the invention, the supply battery of which has been removed, and in which figures the slide-in unit for supporting the SIM card is in the engaged position and in the disengaged position, respectively.

The movable slide-in unit 42 for supporting the card can move slidingly with respect to the baseplate 40 in a direction of installation D1 parallel to the motherboard 28. The slide-in unit can move between an engaged position, in which the slide-in unit is engaged in the body 12, and a disengaged position, in which the slide-in unit is disengaged from the body. In the engaged position, in which it is engaged in the body, as shown in FIGS. 1 and 4, the card S is in a use position. The conducting contacts on the card S and on the baseplate 40 are then applied against each other and the card is held in place with respect to the baseplate. In the disengaged position, when it is disengaged from the body, shown in FIGS. 2 and 3, the card S is in a gripping position. The conducting contacts on the card S and on the baseplate 40 are then far apart and the card is accessible.

The card can be inserted into the slide-in unit 42 in a direction of insertion D2 which is offset at some angle to the direction of installation D1. The directions D1 and D2 are advantageously orthogonal.

The baseplate 40 is placed inside the body of the telephone opposite a recess 44 of rectangular shape which extends longitudinally on the rear face 14 in the direction D1. The recess 44 emerges at its free end in the housing 16 for accommodating the battery. In the engaged position, the external surface of the slide-in unit 42 fills the recess 44 and is flush with the cover 17, providing a continuous surface with the latter.

The body 12 has, along the longitudinal edges of the recess 44, means 46 for guiding the slide-in unit 42. These means comprise, for example, rails placed along the direction of installation D1.

Figure 5:
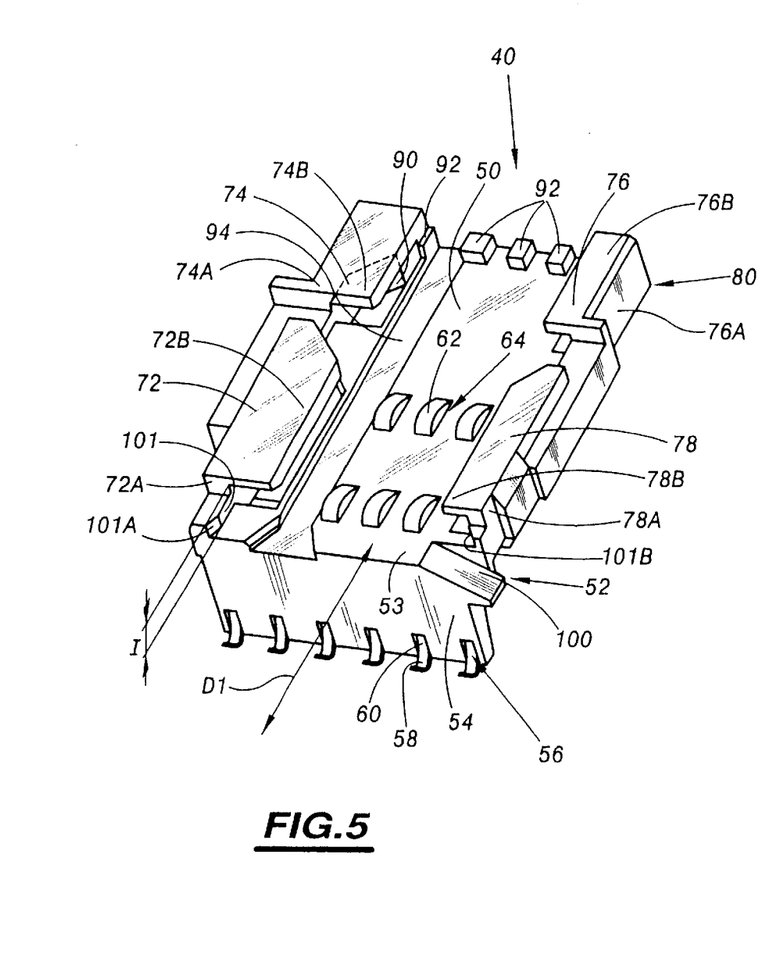
FIGS. 5 and 6 are three-quarter perspective views of the top and bottom, respectively, of the baseplate of the reader according to the invention.
Figure 6:
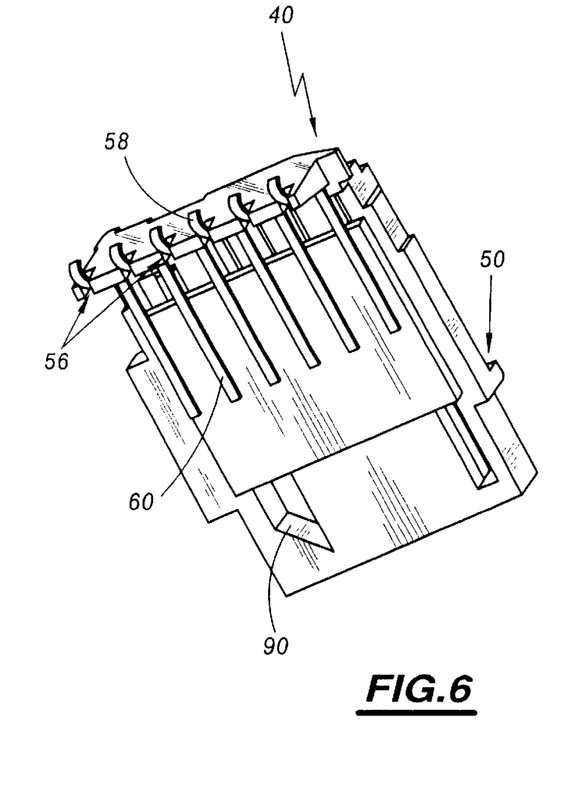

The baseplate 40 shown in FIGS. 5 and 6 has a base 50 intended to support that face of the card S with which the contacts on the chip are flush when the card is in the use position. The base 50 extends parallel to the direction of installation D1 of the card and has a rectangular general shape, the length of which extends along the direction D1.

At an end for inserting the card, denoted by 52, the base 50 has a bearing surface 53 for the card in its gripping position.

At this end, the base 50 is extended externally by a transverse wall 54 extending parallel to the surface of the base 50. The wall 54 is provided on its free edge opposite the base 50 with notches 56 for passage of curved first ends 58 of the flexible conducting blades 60.

As shown in FIG. 6, the conducting blades 60, shown in a simplified manner, extend parallel to the lower surface of the base 50 and project at their second ends 62 through windows 64 passing through the base 50. The ends 62 are bent so as to form conducting contacts which are applied, by elastic deformation, against the corresponding conducting contacts on the chip carried by the card S.

As shown in FIGS. 3 and 4, the baseplate 40 is placed so that it extends parallel to the motherboard 28, the ends 58 of the conducting blades 60 being applied against the latter so as to provide electrical continuity between the chip on the card S and the other components of the motherboard 28.

Furthermore, the baseplate 40 is placed partially opposite the recess 44 so that the conducting contacts 62 are accessible through the recess in the absence of the slide-in unit 42.

The base 50 is bordered, on both sides, along its length, by tabs 72, 74, 76, 78 for retaining the card S against the base 50. The tabs 72 to 78 each have a pillar 72A, 74A, 76A, 78A extending perpendicular to the surface of the base 50. The pillars define surfaces for guiding the card S laterally during its movement in the direction of installation D1. Each pillar 72 to 78 is extended by a retaining flange denoted by 72B, 74B, 76B and 78B respectively. These flanges extend in a cantilever fashion above the base 50 and parallel to the latter.

The height between the facing surfaces of the base 50 and of the flanges 72B to 78B is fixed by the height of the pillars 72A to 78A. The height of this gap, denoted by I, is approximately equal to the thickness of the card S plus a fraction of the height of the conducting contacts.

Thus, a slot for guiding the card, extending along the direction of installation D1, is defined between the base 50 and the tabs 72 to 78.

The retaining tabs 72 and 78 extend parallel to each other along the length of the base 50 in the running part of the latter. The retaining tabs 74 and 76 are provided in the corners of the rear end, denoted by 80, of the base 50, this end being opposite the insertion end 52.

The foot 74A has an inclined lateral surface 90 designed to engage with the cut-off corner of the card S. The inclined face 90 defines an angle of 45° with the longitudinal axis of the base 50.

At its rear end 80, the base 50 has an end stop for the card S in the direction D1. This stop is formed by studs denoted by 92 which project from the surface of the base 50. These studs together define a comb. These stops are designed to engage with the end of the card S and to provide correct axial positioning of the latter with respect to the conducting contacts 62. The height of the studs 92 is approximately equal to that of the gap I.

The studs 92 between them define crenels designed to accommodate elements of complementary shape provided by the slide-in unit 42.

One of the crenels is of greater depth. It is extended over the entire length of the base 50 by a longitudinal groove 94 extending along the direction D1. This groove 94 has, at the insertion end 52 of the baseplate, a gradually increasing width. The groove 94 runs out at its two ends.

At its insertion end 52, the baseplate 40 has a lateral ramp 100 for guiding the card S during its insertion into the slide-in unit 42. This ramp is oriented transversely to the longitudinal axis D1 of the base 50. It extends in a region of the base devoid of card-retaining tabs.

In the example shown, the ramp is made in the thickness of the transverse wall 54.

Moreover, provided on both sides of the bearing surface 53 are chamfers 101A and 101B, these being on an extension 101 of the pillar 72A and on the pillar 78A, respectively. The function of these chamfers is to facilitate the insertion of the card S between the surfaces 101, 72A, 78A and 76A for guiding the card S laterally.

As shown in FIGS. 1 and 2, the housing 16 for accommodating the battery 16A is extended in the cover 17 of the telephone by a cut-away 110 made opposite the ramp 100, in front of the tab 78. The cut-away 110 allows passage for the front end of the card during its transverse engagement into the slide-in unit 42 along the direction of insertion D2.

Figure 7:
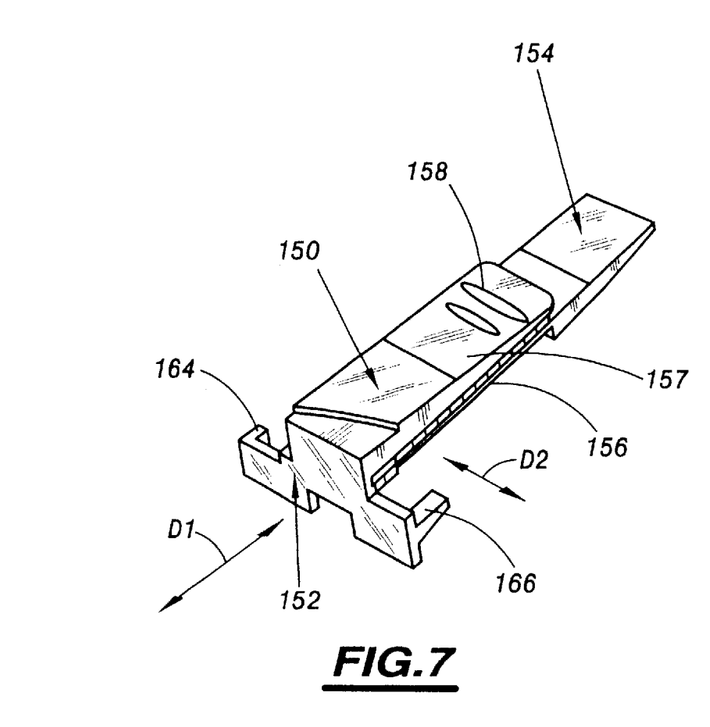
FIGS. 7 and 8 are three-quarter perspective views of the top and bottom, respectively, of the movable slide-in unit of the reader according to the invention.
Figure 8:
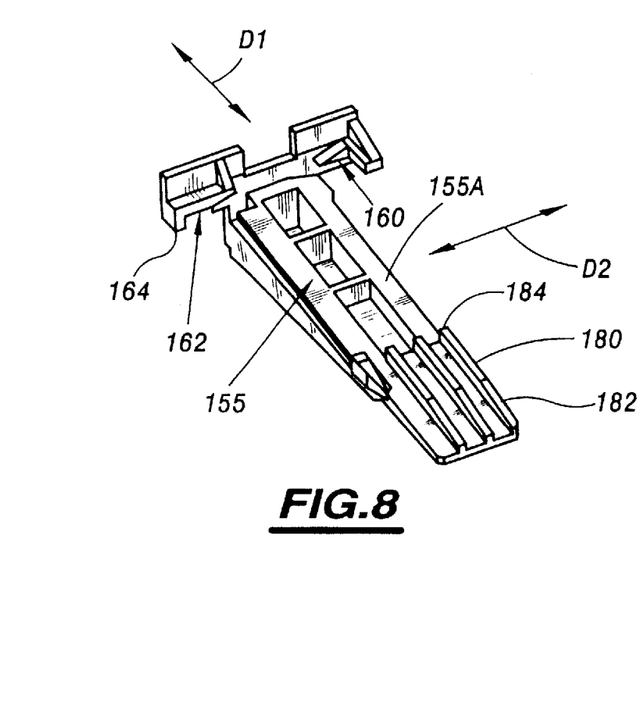

The slide-in unit 42 is shown by itself in FIGS. 7 and 8.

It comprises an elongate body 150 provided with means for supporting a rear end of the card S and with means for retaining the latter in the direction of movement D1 of the slide-in unit 42.

The body 150 is provided at its rear end, in contact with the housing 16, with a transverse wall 152 for supporting and axially retaining the card S.

At its front end, the body 150 is extended axially by a blade 154 for masking the conducting contacts 62.

The body 150 has an approximately flat bottom 155 facing the inside of the body 12 of the telephone. The bottom has a ramp 155A which favours the insertion of the card S. The body 150 has laterally, on each side, parallel guiding grooves 156 made in the thickness of the body. These grooves are designed to engage with the corresponding guiding rails 46 made in the cover 17 of the telephone, along the recess 44.

The fit between the rails and the grooves is designed to ensure that the slide-in unit is held in place, by friction, in the engaged position even in the absence of the battery. The rails and the grooves have stop-forming complementary profiles, comprising projections and indentations, which prevent the slide-in unit from going back into the disengaged position. The projections have ramps allowing the slide-in unit to be put into place by the elastic deformation of these ramps.

The profile of the upper face, denoted by 157, of the body 150 is designed to extend the rear face 14 of the telephone in a continuous manner, when the slide-in unit 42 is in its engaged position in the body of the telephone. The upper face 157 has two raised features 158 which make it easier for the slide-in unit 42 to be moved with a finger of one hand.

The width of the body 150 is less than the corresponding width of the card S.

The transverse wall 152 has an external shape corresponding to that of an opening made in the transverse wall of the body defining the housing 16. It is extended laterally on each side of the body 150 over a distance greater than the width of the card S.

The transverse wall 152 constitutes an axial stop preventing the card S from moving with respect to the slide-in unit 42 in the direction of installation D1 along which the slide-in unit 42 slides.

On its internal face, turned towards the body 150, the transverse wall 152 has, on both sides of the body, pads 160, 162 for supporting the rear edge of the card S.

The pad 162, placed on the opposite side from the side in which the card S is inserted into the slide-in unit 42, is bordered by a lateral stop 164 designed to engage with the corner of the card S in order to position the latter correctly with respect to the slide-in unit before the latter moves into its engaged position. The stop 164 stops the card S during its insertion in the direction D2. The stop 164, although retaining the card S on only one side is sufficient to stop it since the card S cannot rotate about the stop 164 as it is rotationally immobilized by the shoulders 184 on the one hand, and by the face internal to the slide-in unit of the wall 152 on the other hand.

Furthermore, the transverse wall 152 has, on its internal face, on the side for inserting the card S, a temporary bearing surface area 166 for the card, making it easier to insert the latter into the slide-in unit 52 before the card rests on the pads 160 and 162.

The pads 160 and 162 are placed on the wall 152 at a height suitable for the card S, in its gripping position, to rest, on the one hand, on the pads 160 and 162 and, on the other hand, on the bearing surface 53 formed on the insertion edge of the base 50. The card then extends parallel to the plane of the base and to the grooves 156. The pads 160, 162 and the bearing surface 53 together form an area of support for the card S in its gripping position. In this position, a cut-away 168, for manual access to the card S, is formed between the wall 152 and the baseplate 40, because the body 150 has a smaller width than that of the card S and thus the latter protrudes on each side of the body 150. Thus, the cut-away 168 makes it possible to push the card, using a finger, in the direction of insertion D2, so as to release the card from the slide-in unit.

The gap between the pads 160, 162 and the bottom of the body 150 is slightly greater than the thickness of the card S.

The masking blade 154 has a small thickness so as to be able to be accommodated in a recess in the body 12 beyond the baseplate 40, when the slide-in unit 42 is in its engaged position. Its upper face, turned towards the outside, is essentially smooth.

The length of the masking blade 154 is slightly less than that of the base 50. It is at least equal to the length of that region of the base which carries the conducting contacts 62. Thus, the length of the masking blade 154 is such that, when the slide-in unit 42 is in the disengaged position, the blade covers the conducting contacts 62 and makes them inaccessible through the recess 44.

Provided on the lower face of the masking blade 154, which face is turned towards the baseplate 40, are parallel axial ribs 180 designed to engage in the crenels bounded by the studs 92 and the pillars 74A and 76A.

At the free end of the masking blade 154, the ribs 180 have ramps 182 which reduce their height towards this free end.

At their other end, the ribs 180 terminate in coplanar shoulders or steps 184 which together form an axial stop against which the front end of the card S bears. The distance separating the shoulders 184 from the facing surface of the transverse wall 152 is slightly greater than the total length of the card S.

The height of the ribs 180 is designed so that, during the sliding of the slide-in unit 42, the surface of these ribs is approximately flush with the surface of the base 50. Thus, the height of the ribs is approximately equal to the thickness of the card S.

One of the ribs 180 is designed to be partially accommodated in the longitudinal groove 94. For this purpose, it has a height greater than that of the other ribs. Its height is approximately equal to the sum of the thickness of the card S and the depth of the groove 94.

The card reader according to the invention is used in the following manner.

With the supply battery 16A removed from the mobile telephone, the slide-in unit 42 is brought into its disengaged position (shown in FIGS. 2 and 3) by moving it in the direction D1.

The card S is then inserted into the slide-in unit 42 in the direction of insertion D2. For this purpose, the lateral edge of the card is first brought into contact with the ramp 100 and with the bearing area 166. Next, the card is pushed inside the slide-in unit 42 using a finger of one hand. It then slides along the direction D2, being supported at one of its ends on the pads 160 and 162 and at its other end on the bearing surface 53 until it comes into contact with the end stop 164 of the slide-in unit. The card S may also be put into place by gravity, by tilting the telephone about the axis D1 so that the area of support for the card, defined between the base and the slide-in unit, is vertical with the stop 164 under the bearing area 166.

The movement of the card S is completed when the latter comes into contact with the end stop 164.

In this position, the card S is then correctly aligned with the base 50.

Next, the slide-in unit 42 is pushed manually in the direction D1 towards its engaged position. During the movement of the slide-in unit 42, the card S is pushed by the transverse wall 152. The card S then slides over the base 50, being guided laterally by the pillars 72A to 78A.

At the start of the travel of the slide-in unit, the card S is inserted between the pillars 72A and 78A, this insertion being facilitated by the chamfers 101A and 101B as well as by the cut-off corner of the card which slides over the chamfer 101A.

The movement of the card S is completed when the latter comes into contact with the studs 92. Once in contact with the latter, the card is correctly positioned so that the conducting contacts on the chip carried by the card are in contact with the conducting contacts 62 on the reader.

If the card S is not initially positioned correctly in the slide-in unit 42, the slide-in unit cannot be brought completely into its engaged position since one of the corners of the card which has not been cut off then butts against the inclined surface 90. The user is then aware of the insertion error, since it is impossible for him to put the battery in.

After the slide-in unit 42 has been engaged in the body of the telephone, the supply battery 16A is repositioned in its housing 16. The card S is then no longer accessible and the slide-in unit 42 can no longer be moved, the transverse wall 152 butting against the supply battery 16A.

In order to remove the card, the supply battery 16A must firstly be removed so as to allow the slide-in unit 42 to move.

By acting on the raised feature 158 with one finger, the slide-in unit is brought into its position in which it is partially disengaged from the body and in which it projects into the housing 16. During the movement of the slide-in unit 42 in the direction D1, the shoulders 184 press on the front end of the card S and push the latter out of the body of the telephone.

Once the slide-in unit 42 is in its disengaged position, a finger of one hand inserted into the cut-away 168 allows the card S to be removed from the slide-in unit 42, by moving the card in the direction D2.

In addition, since the card S is not constrained by the pressure of the conducting contacts when the slide-in unit is in the disengaged position, an alternative way of removing the card S from the slide-in unit is to tilt the telephone about the axis D1 so that the area of support for the card, partially defined by the slide-in unit, and therefore the card, are thus brought into a vertical plane, the stop 164 being above the bearing area 166, and so that the card falls out of the slide-in unit under the effect of gravity.

The reader according to the invention, and the telephone in which it is employed, have the following advantages.

Since the card is supported by the movable slide-in unit 42, the card is moved away from the baseplate 40 with a long travel. Thus, when the slide-in unit 42 is in its disengaged position, it is easier to grip the card.

Since the conducting contacts 62 are placed opposite the recess 44, they are accessible by a probe for testing the telephone when the slide-in unit 42 has not yet been fitted. Thus, the telephone can be easily tested during its manufacture.

On the other hand, after the slide-in unit 42 has been fitted, the masking blade 154 prevents the conducting contacts 62 from being accessible whatever the position of the slide-in unit 42. Thus, the risks of the conducting contacts 62 becoming damaged or dirty are small.

When the card is in its use position, it is held in place against the base 50 by the tabs 72 to 78 and not by the slide-in unit 42. Thus, since the tabs are made as one piece with the base 50, the positioning is carried out correctly, independently of the precise position of the slide-in unit 42.

Since the slide-in unit 42 opens into the housing 16 for accommodating the supply battery, the card cannot be removed while the mobile telephone is energized.

According to embodiments not shown, the slide-in unit may be fitted so as to be able to move in a transverse direction of the mobile phone or in the thickness direction of the latter.

In both cases, the slide-in unit 42 advantageously has a stop suitable for being held in place by the supply battery 16A, so as to prevent the slide-in unit 42 from moving when the battery 16A is installed in the housing 16.

In general, in order to avoid any short circuit in the card, it is desirable for the card S to be unable to be removed or connected when the telephone is energized.

As a result, there are two constraints, the first being that it is impossible to bring the slide-in unit into the disengaged position with the battery fitted and the second being that it is impossible to fit the battery if the slide-in unit is not in the engaged position.

It should be noted that the first constraint does not mean that the battery holds the card S in place, since the slide-in unit stays all by itself in the engaged position without the battery being fitted.

Three other embodiments (not shown) have been envisaged:

in the first embodiment, the sliding direction D1 of the slide-in unit is transverse with respect to the mobile telephone;

in the second embodiment, the direction D1 is in the thickness of the telephone; and in the third embodiment, the direction D1 is longitudinal but, in contrast to the embodiment shown, the slide-in unit opens on the opposite side from the housing for the battery.

In these other embodiments, it should be noted that the cut-away corresponding to the cut-away 110 may be blocked off by a lateral extension of the front face corresponding to the front face 152 of the slide-in unit, instead of being blocked off by the battery as in the embodiment shown.

In these three other embodiments, the first constraint may be fulfilled in the direction D1 by a stop on the slide-in unit which engages with a stud on the battery, the stud retaining the slide-in unit in the engaged position when the battery is fitted. In the embodiment shown, the first constraint is automatically fulfilled, since the slide-in unit 42 opens into the housing 16 for accommodating the battery—the slide-in unit is de facto locked in the engaged position when the battery is fitted since the front face 152 butts against the body of the battery.

In the two first embodiments, the second constraint may be fulfilled by a stud on the battery which butts against a rib on the slide-in unit, the rib being opposite the stud when the slide-in unit is not in the engaged position, whatever its precise position. In the third embodiment, such a solution is possible if the blade corresponding to the blade 154 slides in the housing of the battery so as to always have a part in the housing when the slide-in unit is not in the engaged position, whatever its precise position; consequently, a stud on the battery may butt against the blade when the slide-in unit is not in the engaged position. An alternative solution in the case of the third embodiment is for the battery to be fixed by a flexible tongue carried by the battery and engaged under the rim of the blade corresponding to 154; thus, when the slide-in unit is not in the engaged position, the rim is clear and the tongue can no longer bear against it, making it impossible to fit the battery.

In the embodiment shown, the second constraint is automatically fulfilled since the body of the battery butts against the bottom 150 of the slide-in unit when it is attempted to fit the battery while the slide-in unit is open. This is particularly advantageous as the user can clearly see why the battery cannot be fitted, whereas in the other three embodiments, the user may not understand why and get angry with the telephone.

Thus, in the light of the objective of fulfilling the two constraints mentioned above, the solution using the embodiment shown, in which the slide-in unit 42 opens onto the housing 16 for the battery, is the obvious and natural one.

Obviously, numerous modifications and variations of the present invention are possible in light of the above teachings. It is therefore to be understood that within the scope of the appended claims, the invention may be practiced otherwise than as specifically described herein.

What is claimed is:

1. A smart-card reader, comprising:
   a baseplate with a plurality of baseplate conducting contacts configured to engage a corresponding plurality of smart-card conducting contacts; and
   a smart-card insertion guide configured to guide a smart-card between a card gripping position where said smart-card is accessible and a card use position where said smart-card is held in place with respect to said baseplate, said smart-card insertion guide comprising,
      a movable slide-in unit configured to move in an installation direction slidingly with respect to said baseplate between an engaged position corresponding to said smart-card use position and a disengaged position corresponding to said smart-card gripping position, wherein said movable slide-in unit comprises,
      a smart-card immobilizer configured to immobilize said smart card in said installation direction, and
      a smart-card support configured to support said smart-card and having a smart-card support area corresponding to said gripping position, said smart-card support area configured to support side loading of said smart-card.

2. The smart-card reader according to claim 1, wherein:
   said movable slide-in unit is configured so said plurality of smart-card conducting contacts and said plurality of baseplate conducting contacts are not in contact when said smart-card is in said smart-card gripping position and are in contact when said smart-card is in said smart-card use position.

3. The smart-card reader according to claim 1, wherein said smart-card support area comprises:
   one of said a smart-card support and a bearing surface on said baseplate.

4. The smart-card reader according to claim 3, wherein said baseplate comprises:
   an inclined ramp having a ramp height which varies in correspondence with said insertion direction, said inclined ramp configured to guide said smart-card towards said bearing surface.

5. The smart-card reader according to claim 3, wherein said movable slide-in unit comprises:

an end stop configured to stop said smart-card when inserting said smart-card into said smart-card support area.

6. The smart-card reader according to claim 3, wherein said movable slide-in unit comprises:

a cut-away configured to provide manual access to said smart-card in its gripping position and configured to allow smart-card movement in said insertion direction and smart-card removal.

7. The smart-card reader according to claim 1, wherein said movable slide-in unit comprises:

a blade configured to mask said plurality of baseplate conducting contacts and to be moved between a first blade position corresponding to said engaged position and a conducting contact mask position corresponding to said disengaged position.

8. The smart-card reader according to claim 1, where said baseplate comprises:

a baseplate base configured to allow said plurality of baseplate conducting contacts to project; and a plurality of baseplate tabs arranged to face said baseplate base and configured to retain said smart-card in contact with said plurality baseplate conducting contacts.

9. The smart-card reader according to claim 1, wherein said baseplate comprises:

a plurality of baseplate surfaces arranged along said insertion direction and configured to laterally guide said smart-card.

10. The smart-card reader according to claim 1, wherein said baseplate comprises:

a baseplate end stop configured to stop said smart-card from moving along said insertion direction.

11. The smart-card reader according to claim 10, wherein said baseplate end stop and sad smart-card immobilizer each comprise:

intercalated complementary projecting profiles configured to move translationally with respect to each other along said insertion direction.

12. A telecommunication equipment unit, comprising:

smart-card reader, comprising, a baseplate with a plurality of baseplate conducting contacts configured to engage a plurality of corresponding smart-card conducting contacts, and a smart-card guide configured to guide a smart-card between a card gripping position where said smart-card is accessible and a card use position where said smart-card is held in place with respect to said baseplate, wherein said smart-card guide comprises, a movable slide-in unit configured to move slidingly in an installation direction with respect to said baseplate between an engaged position corresponding to said smart-card use position and a disengaged position corresponding to said smart-card gripping position, wherein said movable slide-in unit comprises, a smart-card immobilizer configured to immobilize said smart-card in said installation direction, and a smart-card support configured to support said smart-card and having a smart-card support area corresponding to said gripping position, said smart-card support area configured to support side loading of said smart-card.

13. The telecommunication equipment unit according to claim 12, comprising:

a body including a housing configured to accommodate a supply battery, and a slide-in unit movement inhibitor configured to prevent said movable slide-in unit from moving towards said disengaged position when said supply battery is inserted in said housing.

14. The telecommunication equipment unit according to claim 12, comprising:

a body including a housing configured to accommodate a supply battery, and a battery insertion inhibitor configured to prevent said supply battery from being inserted in said housing when said movable side-in unit is not in said engaged position.

15. The telecommunication equipment unit according to claim 13, wherein:

said movable slide-in unit is configured to project inside said housing when said movable slide-in unit is in said disengaged position.

16. The telecommunication equipment unit according to claim 12, wherein said body comprises:

a recess arranged essentially opposite of said plurality of baseplate conducting contacts and configured to allow access to said plurality of baseplate conducting contacts when said movable slide-in unit is absent from said body.

17. The telecommunication equipment unit according to claim 16, wherein said movable slide-in unit comprises:

a maneuvering surface accessible through said recess when said movable slide-in unit is in said engaged position, wherein said movable slide-in unit is configured to extend into said recess.

18. The telecommunication equipment unit according to claim 12, wherein said body comprises:

a cut-away configured to partially define a passage configured to allow insertion of said smart-card in said insertion direction towards said gripping position.

19. The telecommunication equipment unit according to claim 12, wherein said body comprises:

a slide-in unit guide configured to guide said movable slide-in unit in said installation direction.

20. A mobile telephone, comprising:

a smart-card reader comprising, a baseplate with a plurality of baseplate conducting contacts configured to engage a plurality of corresponding smart-card conducting contacts, and a smart-card guide configured to guide a smart-card between a card gripping position where said smart-card is accessible and a card use position where said smart-card is held in place with respect to said baseplate, wherein said smart-card guide comprises, a movable slide-in unit configured to move slidingly in an installation direction with respect to said baseplate between an engaged position corresponding to said smart-card use position and a disengaged position corresponding to said smart-card gripping position, said movable slide-in unit comprising, a smart-card immobilizer configured to immobilize said smart card in said installation direction, and a smart-card support configured to support said smart-card and having a smart-card support area corresponding to said gripping position, said smart-card support area configured to support side loading of said smart-card.

* * * * *